United States Patent [19]

Huang et al.

[11] Patent Number: 6,041,358
[45] Date of Patent: Mar. 21, 2000

[54] METHOD FOR MAINTAINING VIRTUAL LOCAL AREA NETWORKS WITH MOBILE TERMINALS IN AN ATM NETWORK

[75] Inventors: Nen-Fu Huang; Yao-Tzung Wang, both of Hsinchu; Trung-Pao Lin, Kaohsiung, all of Taiwan

[73] Assignee: Industrial Technology Research Inst., Hsinchu, Taiwan

[21] Appl. No.: 08/747,696

[22] Filed: Nov. 12, 1996

[51] Int. Cl.[7] .............................. G06F 13/00; H04B 7/26; H04L 12/66
[52] U.S. Cl. .......................... 709/238; 709/215; 709/223; 709/228; 709/239; 709/249; 709/243; 455/461; 370/331; 370/397; 379/88.19
[58] Field of Search ...................................... 370/395, 396, 370/331, 338, 401, 905, 908, 408; 455/636, 432, 433, 437, 438, 439, 440, 461; 709/249, 238, 253, 223, 243, 228; 379/88.19

[56] References Cited

U.S. PATENT DOCUMENTS

| | | | |
|---|---|---|---|
| 4,766,534 | 8/1988 | DeBenedictis | 364/200 |
| 4,845,744 | 7/1989 | DeBenedictis | 379/221 |
| 5,329,578 | 7/1994 | Brennan et al. | 329/67 |
| 5,353,283 | 10/1994 | Tsuchiya | 370/392 |
| 5,384,826 | 1/1995 | Amitay | 370/338 |
| 5,442,633 | 8/1995 | Perkins et al. | 370/94.1 |
| 5,469,496 | 11/1995 | Emery et al. | 379/58 |
| 5,590,125 | 12/1996 | Acampora et al. | 370/397 |
| 5,659,544 | 8/1997 | La Porta et al. | 370/396 |
| 5,737,328 | 4/1998 | Norman et al. | 370/331 |
| 5,777,994 | 7/1998 | Takihiro et al. | 370/395 |
| 5,787,080 | 7/1998 | Hulyalkar et al. | 370/395 |
| 5,859,981 | 1/1999 | Levin et al. | 709/238 |

OTHER PUBLICATIONS

B. V. Patel, P. Bhattacharya, Y. Rekhter & A. Krishna; An Architecture and Implementation Toward Multiprotocol Mobility; pp. 32–42; IEEE Personal Communications; Jun. 1995.

P. Bhagwat, C. Perkins & S. Tripathi; Network Layer Mobility: An Architecture and Survey; pp. 54–64; IEEE Personalf Communications; Jun. 1996.

J. Ioannidis, D. Duchamp & G. Q. Maguire, Jr., IP–based Protocols for Mobile Internetworking; Proc. of ACM SIG COMM '91; pp. 235–245; Sep., 1991.

M. J. Quinn; Processor Arrays, Multiprocessor, and Multi-computers; pp. 54–58 (1994).

*Primary Examiner*—Frank J. Asta
*Assistant Examiner*—William C. Vaughn, Jr.
*Attorney, Agent, or Firm*—Proskauer Rose LLP

[57] ABSTRACT

A method and system are provided for implementing virtual local area networks (VLANs) over ATM using LAN over ATM emulation technology. Server nodes which provide address registration/resolution and which enable multicast and broadcast routing on each VLAN are interconnected into multiple trees. The root server nodes of each tree are interconnected according to a hypercube topology. Data structures for maintaining the locations and routing information of mobile terminals is provided. Methods for constructing and updating the data structures when a mobile terminal moves from location to another also provided. Methods are also provided for routing packets using the data structures to and from mobile terminals.

24 Claims, 8 Drawing Sheets

METHOD FOR MAINTAINING VIRTUAL LOCAL AREA NETWORKS WITH MOBILE TERMINALS IN AN ATM NETWORK

FIELD OF THE INVENTION

The present invention pertains to communication networks. In particular, the present invention pertains to arbitrarily segregating the nodes of the communication network into separate subnetworks or "virtual local area networks" irrespective of the actual physical interconnection of the nodes. According to the present invention, a manner of maintaining each node in its respective virtual network is achieved even if the node is mobile and dynamically moves from location to location.

BACKGROUND OF THE INVENTION

Figure 1:
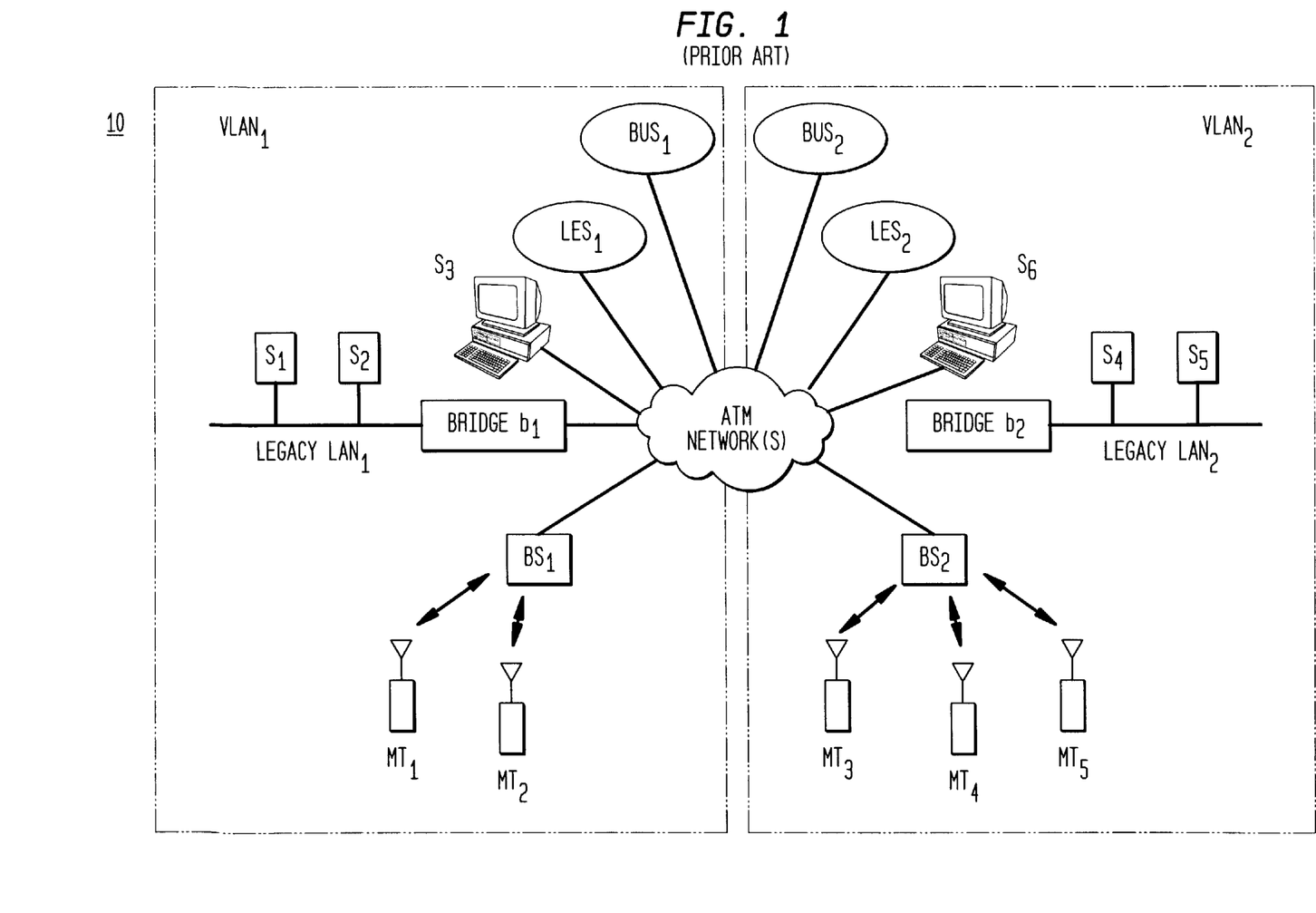
FIG. 1 shows a conventional IP over ATM VLAN.

FIG. 1 depicts a communications network 10. The communications network 10 includes plural nodes s1, s2, s3, s4, s5, s6, MT1, MT2, MT3, MT4, MT5, b1, b2, BS1, BS2, LES1, LES2, BUS1 and BUS2. The nodes s1–s6 are stationary terminals which do not move, such as personal computers. The nodes MT1–MT5 are mobile terminals, such as mobile hosts, cellular telephones, or cordless telephones, which can move. The nodes MT1–MT5 communicate via wireless communications channels with nodes BS1 or BS2. The nodes BS1 and BS2 are base stations. The nodes b1 and b2 are bridges. Their purpose is described in greater detail below. Likewise, the nodes LES1–LES2 and BSU1–BUS2 are local area network emulation server nodes and broadcast and unknown server nodes, respectively. See ATM Forum, LAN Emulation over ATM Version 2-LUNI Specification, Dec., 1995.

Communication in the network 10 may be described according to the OSI seven layer model. However, for sake of convenience, only the data-link and network layers are described. Nodes s1, s2 and bridge b1 are interconnected into a so-called legacy local area network (LAN) LAN1 such as an Ethernet network. Likewise, the nodes s4, s5 and b1 are connected into a second legacy LAN2. Communication is achieved within LAN1 by transmitting a bitstream organized into MAC (media access control) frames at the data-link layer. The MAC frame contains a MAC header and a payload. The MAC header carries control and routing information whereas the payload carries one or more messages to be conveyed between the nodes. Each node in the LAN1 is assigned a fixed MAC address. When a node on the LAN1, such as the node S1, desires to communicate with another node on the LAN1, such as the node s2, the node s1 writes the MAC address of the node s2 in a destination address field of the MAC header and a message to be conveyed into the payload. The node s1 then transmits the MAC frame on the LAN1 where it is received at each node on the LAN1 including the node s2. The node s2 examines the MAC header and compares the destination address in the destination address field to the MAC address assigned to the node s2. Since the two addresses match, the node s2 accepts the MAC frame and retrieves the messages in the payload.

On the other hand, nodes b1, b2, LES1, LES2, BSU1, BUS2, BS1 and BS2 are interconnected into an ATM network. Communication is achieved at the data-link layer in an ATM network by transmitting a bitstream that is organized into fixed length cells, which also have a header portion and a payload portion. Communication at the data-link layer in an ATM network may be radically different than in the LAN1 and LAN2. In particular, according to Ethernet, MAC frames are transmitted asynchronously and on all links of the LAN1 or LAN2 to all nodes. The nodes which are the intended recipients of the MAC frames receive the respective MAC frames and accept the data. In contrast, according to ATM, cells are communicated in dedicated virtual channels between pairs of nodes. A virtual channel (VC) is defined as a communication channel dynamically allocated by a node for transmitting cells of a particular connection to a second node. The collection of all VC's of a sequence of connections is referred to as a virtual channel connection (VCC). In setting up a sequence of connections, a VCC identifier is assigned to the communication. Each node (e.g., the node b1) in the sequence of nodes (e.g., b1, . . . , b2) allocates a virtual channel for conveying cells to the next node in the sequence of nodes for the communication (e.g., the node b2). Each node of the sequence of nodes creates an entry in a routing table for each communication. Each entry is indexed by the VCC identifier of the respective communication and contains information regarding how to transmit received (or newly generated) cells to the next node of the sequence of nodes. For instance, the indexed routing table entry may contain an indication of the virtual channel for routing the cell, such as a VC identifier (VCI). In setting up a communication, a source node transmits a communication setup request cell to an appropriate node capable of setting up the communication. The set up request cell contains the ATM address of the destination node. The setup request cell propagates from node to node of the ATM network as VC's are allocated for the communication until the destination node is reached. A response cell is then transmitted back to the source node indicating the VCC identifier of the communication that is set up.

Once the sequence of connections is set up, the source node (e.g., b1) generates one or more cells. The source node b1 writes the VCC identifier assigned to the communication in the cell header and messages to be conveyed to the destination node (e.g., b2) in the cell payload. The node b1 then writes the generated cells into particular timeslots of an outgoing bitstream transmitted to the next node of the sequence of nodes for that communication. Each intermediate node which receives the cell utilizes the VCC identifier stored in the cell to access a routing table thereat. The intermediate node utilizes the retrieved routing table entry (specifically, the VCI of the retrieved routing table entry) to transmit the cell on the appropriate VC to the next node of the sequence of nodes. This process is repeated at each intermediate node until the cell arrives at the destination node b2.

In transmitting cells on VC's, each node writes a cell into a time slot of an outgoing bitstream destined to another node, which time slot is allocated for the VC. Likewise, each node selectively reads cells from timeslots of received incoming bitstreams and performs the same writing operation to other outgoing bitstreams. This form of adding and dropping of cells from different bitstreams is referred to as cell layer multiplexing.

As noted above, the data-link layer forms of communicating in the legacy LAN1 and LAN2 are different than in the ATM network. The purpose of the bridges b1 and b2 is to receive information from one network transmitted according to the respective data-link layer and retransmit the information in the other network according to its respective data-link layer. The bridges b1 and b2 therefore decouple the two incompatible data-link layers from each other yet enable communication between nodes in each of the two networks.

At the network layer, all of the nodes may communicate using the same protocol, e.g., the internet protocol or IP. Like the Ethernet protocol, each node that can serve as a source or destination node is assigned a unique IP identifier or IP address. Information is transmitted from a source node to a destination node in a bitstream that is organized into packets. Each packet has a header and a payload. The IP address of the source node is written in a source field of the packet header and the IP address of the destination node is written in a destination field of the packet header. The data is then written in the payload. The packet is then transmitted according to the appropriate data-link layer protocol for the network (e.g., formed into MAC frames, divided into ATM cells, etc.) and then transmitted to its respective destination node. IP provides a routing function for routing a packet from node to node in a sequence of nodes until the packet arrives at its destinations using routing tables that are similar to the ATM cell routing tables.

It is desirable to organize the nodes into "logical" networks or virtual LANs (VLANs). In a VLAN, a particular set of arbitrary nodes are segregated into groups regardless of the location of the nodes and the data-link layers they employ in communicating. That is, hosts nodes physically located in different subnetworks may be logically connected as a single VLAN. This closed group is administered as a logical LAN independent of other groups of host nodes. In the Internet area, these logical LANs are referred to as Logical IP Subnets (LIS). Typically, an LIS requires manual configuration of each host by LAN administrators of each LAN where a logical LAN host is physically located.

FIG. 1 shows one organization of the nodes into VLANs, e.g., the nodes s1, s2, s3, b1, BS1, MT1, and MT2 are organized into a first VLAN VLAN1 and the nodes s4, s5, s6, BS2, MT3, MT4 and MT5 are organized into a second VLAN VLAN2. Nodes generally speaking can only know the data-link layer addresses of, and communicate directly with, other nodes within their respective VLANs. LES1 and LES2 are provided in order to accommodate inter-VLAN communication. In particular, when a node on a first VLAN, e.g., node MT1, desires to communicate with a node on a different VLAN, e.g., node s4, the node MT1 transmits an address resolution protocol (ARP) request packet containing the IP address of the destination node s4 to the LES1. The LES1 transmits the ARP packet to one or more other LESs, including the LES2. The LES2 maintains an address translation table for translating IP addresses of each of its connected nodes to data-link layer addresses. Io that end, whenever a node is added to, or deleted from, the VLAN2, the translation table of the LES2 is updated to account for the added or deleted node. The LES2 responds to the ARP packet by transmitting a reply packet to the LES1 containing the IP address to data-link layer address translation for the node s4. In this case, the translation may consist of the ATM address of the bridge b2. The LES1 then transmits the reply packet to BS1. The node BS1 then sets up a VCC with the node b1. Thereafter, the packets can be transmitted from the node MT1 to the node BS1 to the ATM communications network to the node b1 and then to the node s4.

The above described scheme describes the address translation for unicast routing in which a packet is to be transmitted to only a single destination node. In addition to supporting unicast routing, IP also supports broadcast routing in which a packet is to be delivered to all nodes in a respective VLAN. The BUS nodes BSU1 and BUS2 are provided for purposes of supporting multicast and broadcast routing. In particular, in the context of broadcast routing, the nodes BSU1 and BUS2 must maintain a list of data-link layer addresses for transmitting copies of a broadcast packet to each node on the respective VLAN, i.e., VLAN1 or VLAN2. For example, the BSU1 must maintain the ATM addresses of the nodes b1, BS1 and s3 so that a copy of a broadcast packet can be transmitted to each of these nodes. (The node b1 transmits the received packet on the LAN1 where it is received by each node s1 and s2 whereas the node BS1 must transmit a separate copy of the broadcast packet to each node MT1 and MT2.)

One LES and one BUS are typically provided per VLAN. However, the LES and BUS need not be implemented on physically distinct or separate hardware. Rather, the LES and BUS functions may be provided by a single router computer or may be implemented in an ATM switch.

Figure 2:
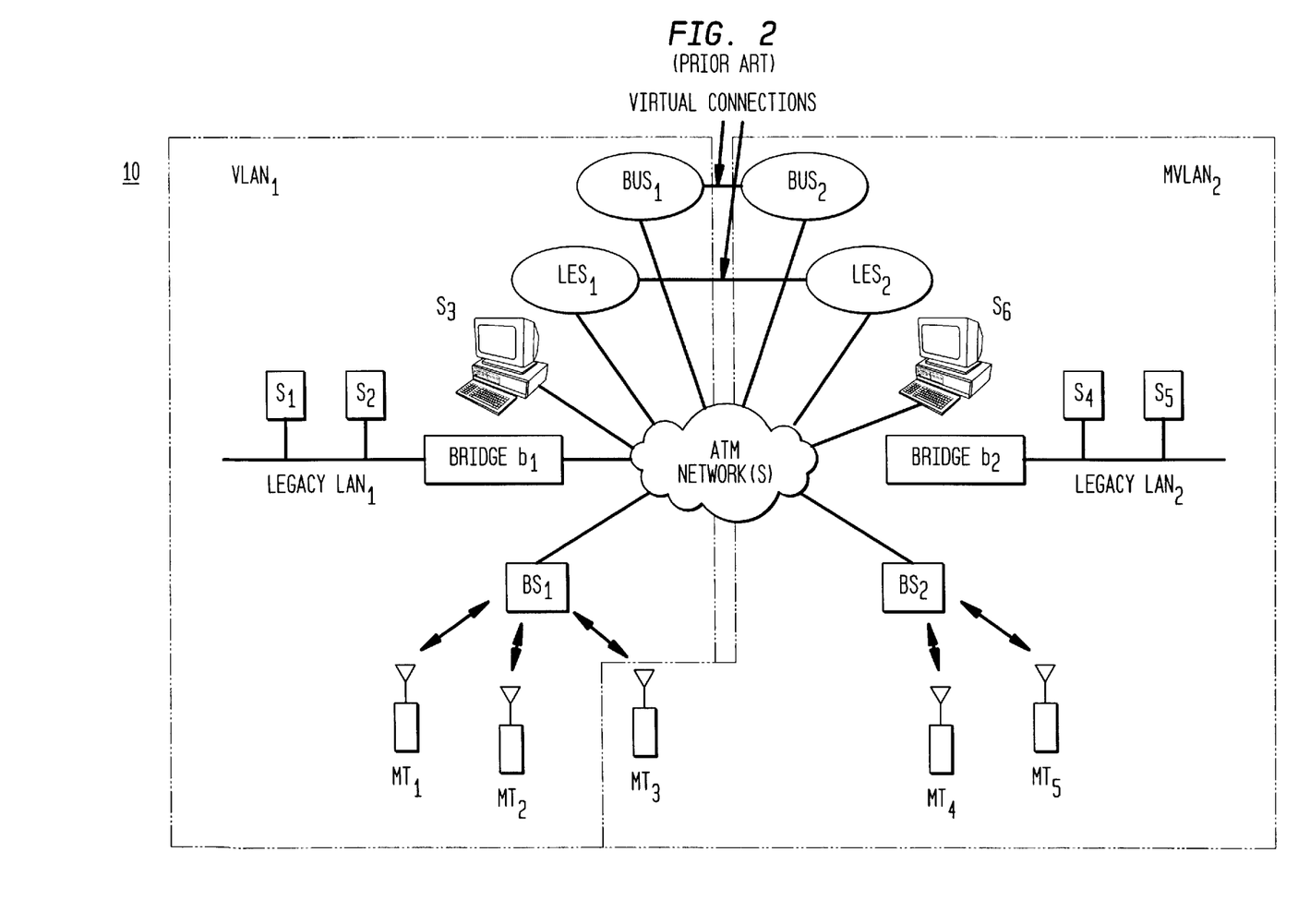
FIG. 2 shows the conventional VLAN of FIG. 1 after an MT moves.

Interconnection of the nodes MT1–MT5 into a VLAN present a special problem due to their mobility. In particular, a mobile terminal, by its nature, is mobile, and moves from location to location. When the mobile terminal moves, it may leave the proximity of a base station which currently provides communication for the mobile terminal, and enter the proximity of a new base station. For example, as shown in FIG. 2, the node MT3, in the proximity of, and which is provided packet communication by, the node BS2, may move out of proximity with BS2 and into proximity with BS1. When this occurs, the nodes MT3, BS2 and BS1 execute a handoff procedure whereby the node MT3 first transmits a handoff message to the node BS2. In response, the node BS2 "deregisters" the node MT3 and ceases to provide communications therefor. The node MT3 then transfers a message to the node BS1 which causes the node BS1 to "register" the node MT3 and begin providing communications for the node MT3.

When a mobile terminal moves such that it is handed off from a base station in one VLAN to a base station in another VLAN, some manner of maintaining the moving mobile terminal in its respective VLAN must be provided. Such provision must be achieved for both unicast and broadcast routing.

Several conventional techniques have been proposed for maintaining the VLANs even in the event that mobile terminals are handed off from a base station in one VLAN to a base station in another VLAN. See, B. V. Patel, P. Bhattacharya, Y. Rekhter & A Krishna, An Architecture and Implementation Toward Multiprotocol Mobility, IEEE PERSONAL COMM., vol. 2, no. 3, p. 32–42, June, 1995; P. Bhagwat, C. Perkins & S. Tripathi, Network Layer Mobility: An Architecture and Survey, IEEE PERSONAL COMM., vol. 3, no. 3, p. 54–64, June, 1996; and J. loannidis, D. Duchamp & G. Q. Maguire, Jr., IP–Based Protocols for Mobile Internetworking, PROC. OF ACM SIGCOMM'91, p. 235–45, September., 1991. The Patel reference proposes to "hide" network topology changes at the data-link layer when a mobile terminal performs a handoff procedure as illustrated above. In particular, the data-link layer frames (MAC frames or cells) are encapsulated into IP frames. On the other hand, the Bhagwat and loannidis references propose to hide the network topology changes at the network layer. With the topology change "hidden" at the data-link or network layers, these references then propose to perform all routing at the IP level. These proposed techniques would thus support station mobility throughout the Internet.

Other techniques are known for enabling hosts to move from location to location yet still be contacted. U.S. Pat. No. 5,329,578 teaches a personal communications system (PCS) in which a telephone subscriber can maintain a profile of locations in which the subscriber may be found. The re-routing of telephone call connections from location to location may be prescheduled. Alternatively, a hunting technique may be used, wherein a central controller will send a call set-up request to (i.e., will ring) each location of a pre-specified sequence of locations. The disclosed techniques are disadvantageous because the location of the subscriber is not automatically registered as the host moves from location to location. U.S. Pat. No. 5,469,496, on the other hand, teaches a system wherein mobile hosts (cellular phones) handoff between base stations automatically when they move. Information regarding the current location of all mobile hosts is located in a single integrated service control point (ISCP). Thus, a user desiring to contact a specific cellular phone can simply dial the telephone number of that phone and the ISCP will direct the call to the appropriate cell containing the cellular phone. However, this patent does not consider the problem of maintaining a VLAN including the mobile host, how to provide address resolution or to enable broadcast packet routing. Rather, only switched communications, where the telephone number of the destination is known ahead of time, are described. U.S. Pat. No. 5,442,633 teaches a system in which mobile hosts use a loose source routing technique to maintain data communications in the event the mobile host moves. When a mobile host moves to another base station, the mobile host transmits a packet to a server assigned thereto, called a mobile router, indicating the IP address of the base station to which it has moved. Initially, packets are routed at the network layer (without encapsulation) via the mobile router. However, when the mobile host transmits a packet to another host, it includes the IP address of the base station currently serving it, according to the loose source routing technique. If the other host can operate according to the loose source routing technique, that other source may transmit subsequent packets to the mobile host directly to the base station that serves the mobile host by specifying the IP address of the base station (thereby circumventing the mobile router).

It is an object of the present invention to maintain multiple VL,AN domains on an ATM network even when the VLANs contain mobile stations.

SUMMARY OF THE INVENTION

This and other objects are achieved according to the present invention. An illustrative environment of use of the invention is a communications network in which IP over ATM is implemented to establish virtual local area networks (VLANs). The communication network illustratively includes mobile terminal nodes (MTs) and base station nodes (BSs) where the BSs are capable of providing packet communication for MTs in their proximity. BSs can provide packet communication for MTs in the same VLAN as the BS or a BS on a first VLAN can provide packet communication to one or more "foreign" MTs on second, third, etc., VLANs. Server nodes, such as local area network emulation servers (LESs) and broadcast and unknown servers (BUSs) are provided for establishing and maintaining the VLANs. According to the invention, the server nodes are connected by (fixed or dynamic) virtual channels (VCs) into multiple trees. The root server nodes are then interconnected by VC's into a hypercube. While the VC's that form the interconnection may be fixed or dynamic, the hypercube over tree interconnection structure of the server nodes illustratively remains fixed.

According to one embodiment, each server node maintains two MT membership tracking databases (MTDs) referred to as IN-MTD and OUT-MTD. The OUT-MTD simply records the number of MTs on the same VLAN as the server which have moved into the proximity of, and are provided packet communication by, a BS on a different VLAN. Conversely, the server node uses the IN-MTD to record the local BSs (i.e., on the same VLAN as the server node) which provide packet communication for foreign MTs. The IN-MTD has one or more entries which each contain: an identifier of a foreign VLAN, an ATM address of a local BS, a VCC for communicating with the respective local BS and a count of the number of foreign MTs on the corresponding VLAN for which the corresponding local BS provides packet communication. In addition, the root server nodes also maintain an inter-tree-MTD. The inter-tree-MTD indicates, for each VLAN, the number of MTs provided packet communication by BSs of each tree.

According to another embodiment, a maintenance procedure is provided for updating each of the MTDs. When an MT moves from a proximity of an original $BS_{orig}$ on an original $VLAN_{orig}$ to a proximity of a new $BS_{new}$ on a new $VLAN_{new}$, the $BS_{orig}$ determines if $VLAN_{new}$ is the same as $VLAN_{orig}$. If not, the $BS_{orig}$ transmits a first message frame to its server for $VLAN_{orig}$ containing the identifier of the VLAN that the MT is on (VLAN-ID(MT)), $VLAN_{new}$ and the ATM address of $BS_{orig}$. The server node receives the frame and updates the appropriate MTD. If VLAN-ID(MT) is the same as $VLAN_{orig}$, then the MT is moving away from a proximity of a BS on same VLAN as the MT. In such a case, the OUT-MTD is updated. Otherwise, the MT is simply moving away from a proximity of a BS on a different VLAN as the MT. In the latter case, the IN-MTD is updated.

According to another embodiment, if the tree containing the $VLAN_{new}$ ($Tree_{new}$) of the moving MT is different from the tree containing the $VLAN_{orig}$ ($Tree_{orig}$), the server node on $VLAN_{orig}$ also transmits a second message frame to a server node at a root of $Tree_{orig}$. The second message frame contains VLAN-ID(MT), $Tree_{orig}$, $Tree_{new}$. In response, the server node of $Tree_{orig}$ updates the inter-tree-MTD thereat to indicate the movement of the MT from $Tree_{orig}$ to $Tree_{new}$. The server node at the root of $Tree_{orig}$ then transmits the second message frame to each other root server node of each other tree which each perform a corresponding update of its inter-tree-MTD.

According to yet another embodiment, when a MT moves from the proximity of $BS_{orig}$ to a proximity of $BS_{new}$, the $BS_{new}$ transmits a third message frame to a server node of $VLAN_{new}$ containing VLAN-ID(MT) and an ATM address of $BS_{new}$. $VLAN_{new}$, in turn, updates the MTD (IN-MTD or OUT-MTD) maintained thereat to reflect the movement of the MT. If necessary, a new entry in the IN-MTD is constructed.

According to a further embodiment, a method is provided for routing packets from MTs. A server node of a VLAN receives a packet originally transmitted from an MT containing (VLAN-ID(MT)). If the server node is not the root node of a tree, the server node transmits the packet to a parent server node of the tree. If the server node is the root node of the tree, the server node accesses its inter-tree-MTD to determine each other tree containing at least one MT on the VLAN identified by VLAN-ID(MT). The server node then transmits a copy of the packet to each of the identified trees. Furthermore, the server node transmits the packet to each child server node (except of course, if the packet is received from a particular child server node, the packet is not transmitted back to that particular child server node).

The invention therefore provides a simple manner for keeping track of the location of each MT and a simple manner for routing packets to such an MT.

DETAILED DESCRIPTION OF THE INVENTION

Hypercube over Tree Server Node Organization

Figure 3:
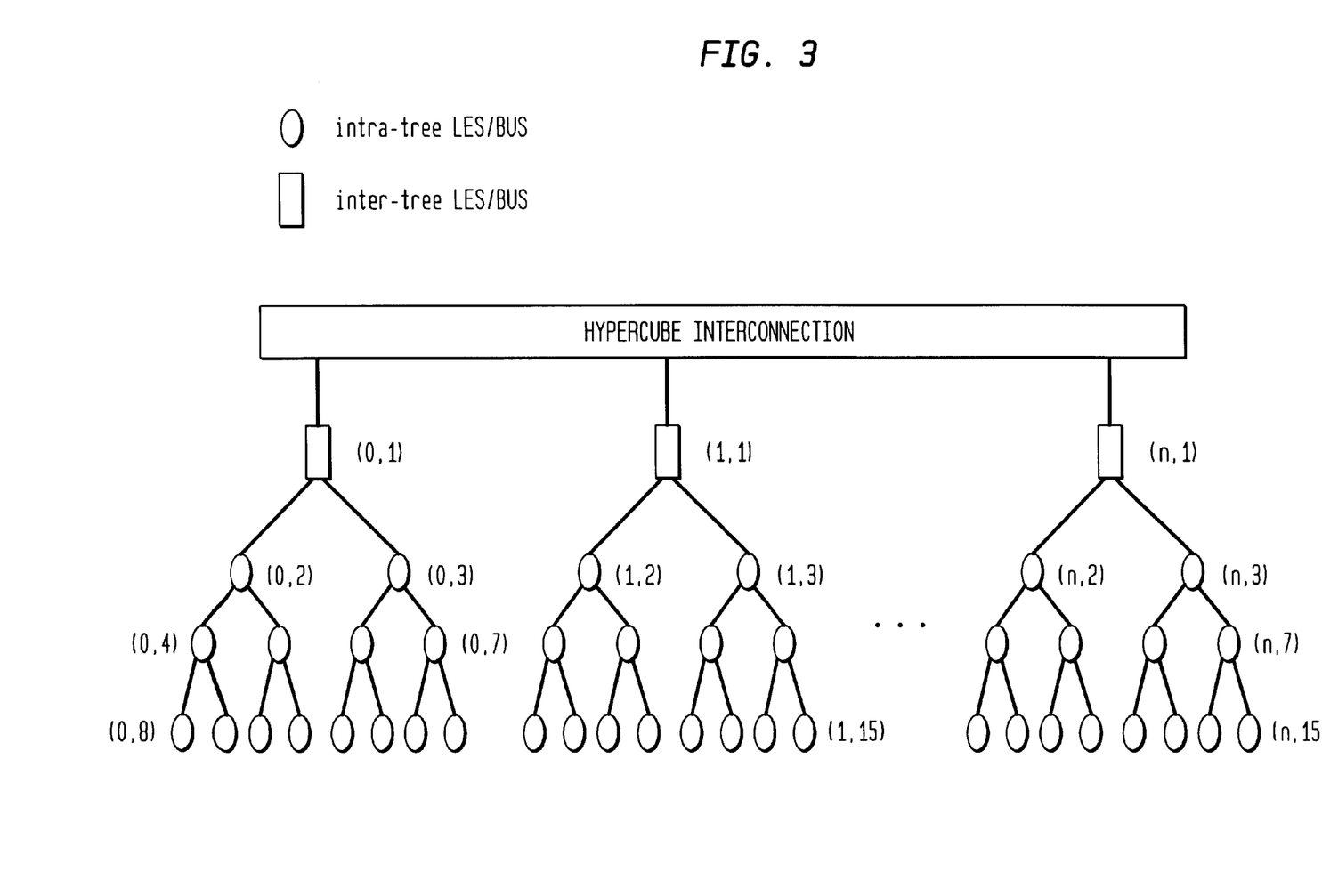
FIG. 3 shows an organization of server nodes according to an embodiment of the present invention.

According to the invention, the LES/BUS node pairs of each VLAN are organized into a hypercube over tree (HOT) structure. Independently, the tree network topology and the hypercube topology are well known network topologies in the parallel computing art. See M. J. QUINN, PARALLEL COMPUTING: THEORY AND PRACTICE, pages 54–58 (1994). In the present invention, these topologies are combined to obtain the benefits of both topologies. Essentially, the HOT structure comprises multiple tree topology component networks, wherein the root nodes of the tree component networks are interconnected into a hypercube configuration. FIG. 3 illustrates a general HOT organization wherein the trees are binary trees. Each node includes a LES/BUS pair of a single different VLAN. The "interconnections" are in fact VC's allocated for communicating between the various nodes shown as interconnected. The VC's can be fixed or can be dynamic.

Each tree includes a root server (LES/BUS pair) node and non-root server nodes. The root server nodes are referred to herein as "inter-tree" server nodes and the non-root server nodes are referred to as "intra-tree" server nodes. The following convention is used herein to label each server node. Each tree is assigned a unique integer i=0,1,2,3, . . . . Within each $i^{th}$ tree, the inter-tree server node is assigned as a label the pair of integers (i,1), where i is the integer assigned to the tree containing the inter-tree server node. The intra-tree server nodes are also assigned as labels, unique pairs of integers (i,j) where j=2,3,4, . . . . The value of j assigned to an intra-tree server node increases in increasing depth and from left to right.

Each VLAN is assigned a unique identifier indicating the location of the VLAN in the HOT organization. For sake of convenience, the identifier assigned to the VLAN is the same pair of integers (i,j) used to label the server node on the VLAN that provides the LES and BUS functions for that VLAN.

The HOT structure offers a smaller "diameter" and more balanced traffic pattern. Furthermore, direct and redundant paths are provided between each pair of trees. For instance, a two dimensional HOT has two paths between each tree; a three dimensional HOT has three paths between each tree, etc. Thus, traffic concentration around individual root nodes is reduced.

Figure 4:
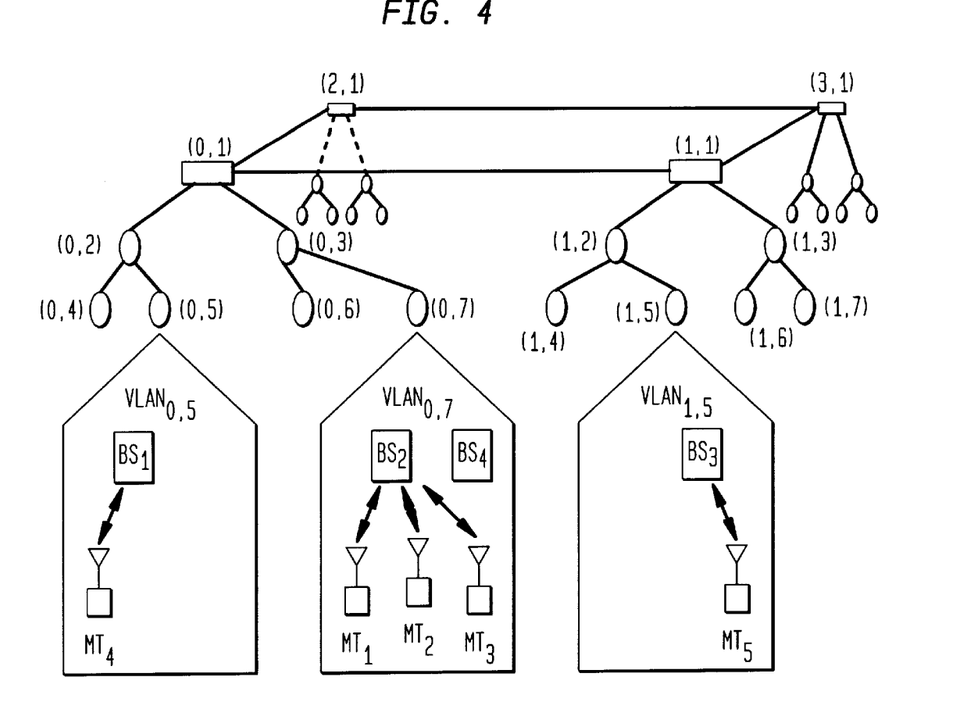
FIG. 4 shows VLANs organized according to the invention.

FIG. 4 illustrates the organization of server nodes in a HOT structure according to the invention. Illustratively, four binary trees 0,1,2 and 3 are formed and their inter-tree server nodes (0,1), (1,1), (2,1) and (3,1) are formed into a two-dimensional hypercube (square) structure. The Tree0 includes server nodes (0,1), (0,2), (0,3), (0,4), (0,5), (0,6) and (0,7). The Tree1 includes the server nodes (1,1), (1,2), (1,3), (1,4), (1,5), (1,6) and (1,7). As shown, three VLANs are depicted in greater detail, namely, VLAN (0,5) on Tree0, VLAN (0,7) also on Tree0 and VLAN (1,5) on Tree1. On VLAN (0,5) are BS1 and MT4 (in communication with BS1). On VLAN (0,7) are s4, BS2 and MT1, MT2, MT3 (all in communication with BS2). On VLAN (1,5) are BS3 and MT5 (in communication with BS3).

Figure 5:
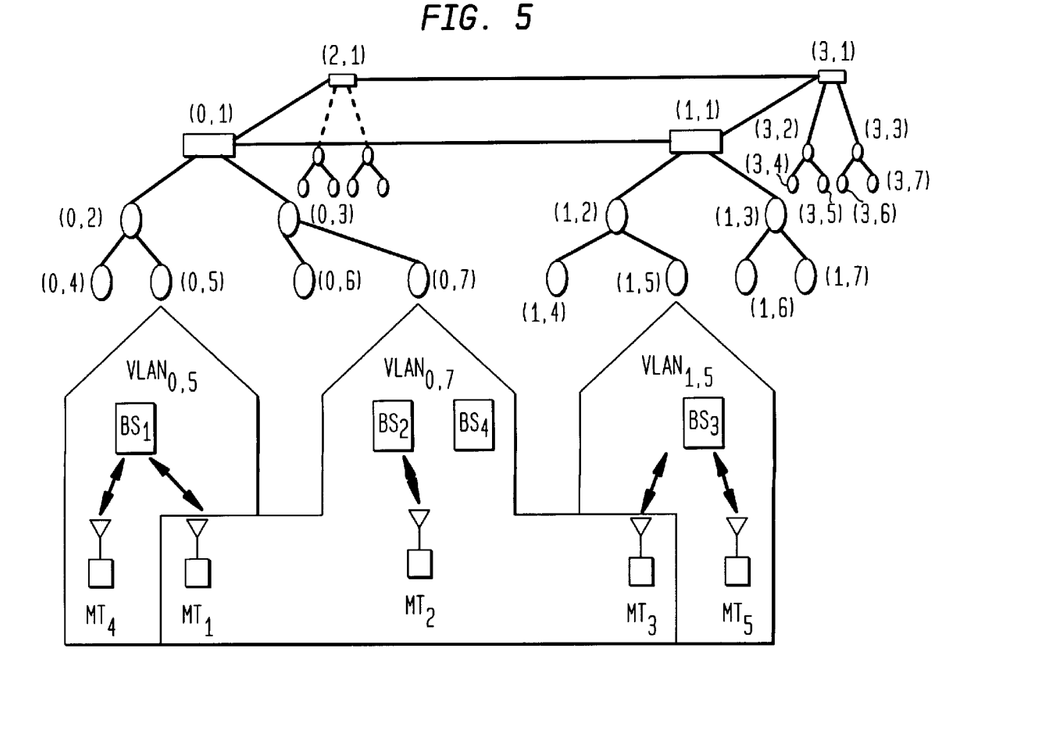
FIG. 5 shows a movement of MTs in the VLAN of FIG. 4.

Next as shown in FIG. 5, MT1 moves from the proximity of BS2 to the proximity of BS1. A handoff procedure is executed so that BS2 deregisters MT1 and ceases to provide packet communication for MT1. Likewise, BS1 registers MT1 and begins to provide packet communication for MT1. Furthermore, MT3 moves from a proximity of BS2 to a proximity of BS3. As shown, BS2 ceases to provide packet communication for MT3 and BS3 begins to provide packet communication for MT3.

Despite the movement of MT1 and MT3 so that they are no longer provided packet communication by BS2 on the same VLAN (0,7), it is still desirable to maintain MT1 and MT3 on the same VLAN (0,7). This is achieved as described below.

Mobility Membership Tracking Databases

Each intra-tree server node maintains two databases for tracking the movement of MTs, namely, the IN-MTD and the OUT-MTD. The OUT-MTD is simply a count OUT-Count of the number of MTs on the VLAN served by the intra-tree server node which MTs have moved out of proximity of any BSs of the VLAN and into proximity of a BS on a different VLAN. When this count is zero then all MTs of the same VLAN as the server node are in the proximity of, and are provided packet communication by, a BS on the same VLAN as the MT (and the server node). No special processing according to the invention is needed to perform VLAN packet routing under such circumstance. In FIG. 4, the OUT-MTD for each of the VLANs (0,5), (0,7) and (1,5) is zero. In FIG. 5, the OUT-MTD for the VLAN (0,7) is 2.

The IN-MTD is used by a given server node to record foreign MTs (i.e., on VLANs other than the VLAN of the given server node), which are in the proximity of a local BS (i.e., on the same VLAN as the given server node). Table 1 shows an illustrative IN-MTD.

TABLE 1

| VLAN-ID | IN-Count | ATM address of BS | VCC to BS |
|---|---|---|---|
| (1,2) | 1 | ATM(BSk) | VCC(BSk) |
| (3,4) | 4 | ATM(BSk) | VCC(BSk) |

In Table 1, VLAN-ID is the identifier of a VLAN of an MT in a proximity of, and being provided packet communication by, a local BS. IN-Count is the number of foreign MT's from the VLAN having identifier VLAN-ID, in the proximity of, and provided packet communication by, the local BS. Each entry also stores the ATM address of, and the VCC to, the local BS providing packet communication to the foreign MTs. In Table 1, a local BS, namely, BSk, provides packet communication to one foreign MT on the VLAN (1,2) and four foreign MTs on the VLAN (3,4).

Each inter-tree server node maintains the above two MTDs, namely, IN-MTD and OUT-MTD. In addition, the inter-tree server nodes also maintain an inter-tree-MTD. The inter-tree-MTD indicates, for each VLAN, the number of MTs that are provided packet communication (by a BS) in each tree. Table 2 illustrates an illustrative inter-tree-MTD.

TABLE 2

| VLAN-ID | Count (Tree0) | Count (Tree1) | Count (Tree2) | Count (Tree3) |
|---|---|---|---|---|
| (1,1) | 1 | 15 | 0 | 2 |
| (3,2) | 0 | 2 | 1 | 10 |

As before, VLAN-ID is the identifier of a specific VLAN. Count($Tree_n$) is the total number of MTs for the respective VLAN (having the identifier VLAN-ID) in a proximity of, and provided packet communication by, a BS of $Tree_n$. Thus, VLAN(1,1) has 1 terminal that is provided packet communication by a BS on a VLAN on Tree0, 15 terminals that are provided packet communication by some BSs on VLANs of Tree1 and 2 terminals that are provided packet communication by some BSs on VLANs of Tree3. Likewise, VLAN (3,2) has 2 terminals that are provided packet communication by some BSs on VLANs of Tree1, 1 terminal that is provided packet communication by a BS on a VLAN of Tree2 and 10 terminals that are provided packet communication by some BSs on VLANs on Tree3.

Initially, each server node initializes its OUT-MTD to be zero and has no entries in its IN-MTD. Each inter-tree server node initializes its inter-tree-MTD to provide the total count of MTs for each VLAN located only in the tree of that VLAN. The updating of these tables and the construction of entries for the IN-MTD are described in greater detail below.

Mobility Tracking Procedures

Initially, assume that each MT is provided packet communication by a BS on the same VLAN as the MT. Each BS is presumed to maintain a registration database in which the BS records information regarding each MT for which it provides packet communication. In particular, the registration database contains the VLAN-ID of the VLAN which each MT is on, denoted herein as VLAN-ID(MT). Such information could be obtained during the handoff.

When a MT moves out of the proximity of a first BS and into the proximity of a second BS, the MT and BSs perform a handoff procedure. Under the handoff procedure, the MT issues a packet to the first BS. In response, the first BS deregisters the MT from its registration database. The MT also issues a packet to the new BS including its data-link layer address (illustratively, the MTs are IEEE compliant and use MAC addresses as their data-link layer address). In response, the second BS registers the MT in its registration database. During the handoff, the MT knows the VLAN-ID of the new VLAN containing the second BS.

In order to record the movements of each MT, message frames are transmitted by the moving MTs, the BSs and the server nodes. Illustratively, three types of message frames are transmitted as follows:

Mobility Message 1 (MM1)—This message is transmitted by the BS that is currently in a proximity of, and which currently provides packet communication for, the MT ($BS_{orig}$) to the server of the current VLAN ($VLAN_{orig}$) The MM1 message frame is for the purpose of updating OUT-MTD and/or IN-MTD to reflect the movement of an MT from the proximity of $BS_{orig}$ to the proximity of a BS on a (foreign) VLAN other than $VLAN_{orig}$. The MM1 message frame contains the VLAN-ID(MT), the identifier for $VLAN_{new}$ and the ATM address ($ATM(BS_{orig})$).

Mobility Message 2 (MM2)—This message is initiated from an intra-tree server node which receives an MM1 message frame if the $VLAN_{new}$ to which the MT moves is on a different tree than the $VLAN_{orig}$ where the MT started. The MM2 message frame is transmitted from child intra-tree server node to parent server node until the MM2 message frame is received at an inter-tree server node. The purpose of this MM2 message frame is to notify the inter-tree server nodes to update their respective inter-tree-MTDs to reflect the movement of the MT from (the proximity of a BS in) an original tree ($Tree_{orig}$) containing $VLAN_{orig}$ to (the proximity of a BS in) a new tree ($Tree_{new}$) containing $VLAN_{new}$. This message frame contains VLAN-ID(MT), an identifier for $Tree_{orig}$ and an identifier for $Tree_{new}$.

Mobility Message 3 (MM3)—The MM3 message frame is transmitted by $BS_{new}$ to a server node on $VLAN_{new}$ for purposes of updating the OUT-MTD and/or IN-MTD thereat.

The MM3 message frame contains VLAN-ID(MT) and the ATM address of $BS_{new}$ ($ATM(BS_{new})$).

Figure 6:
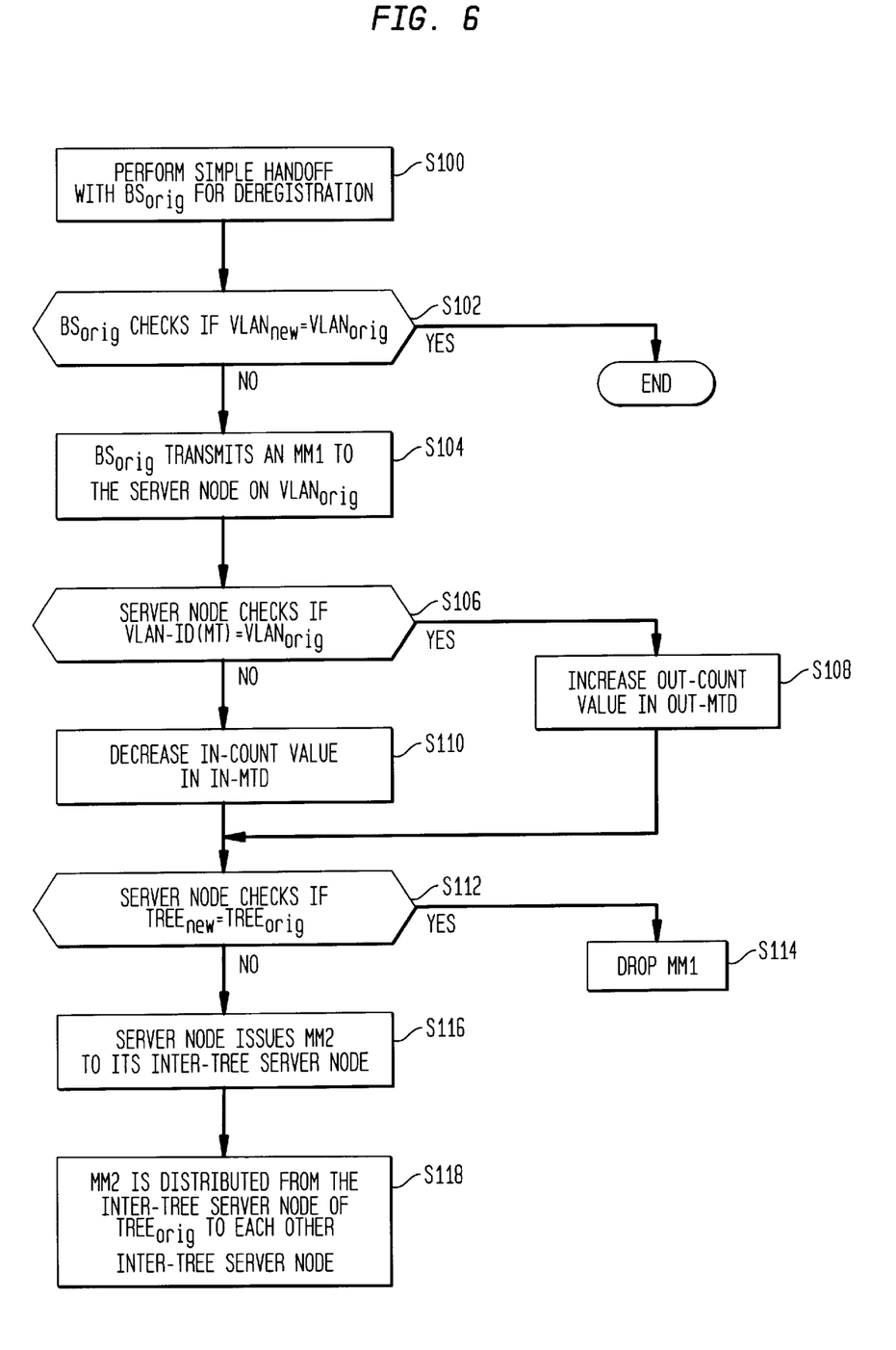
FIG. 6 shows a flowchart of the procedures performed by the moving MT, the $BS_{orig}$ and the server node of the $VLAN_{orig}$ when the MT moves.

The processes executed by the MT, BSs and server nodes are now described with reference to FIGS. 6 and 7. An MT initially is in the proximity of, and receives packet communication from, an original BS ($BS_{orig}$) in an original VLAN ($VLAN_{orig}$). $VLAN_{orig}$ need not be the same VLAN as the VLAN which the MT is on (VLAN-ID(MT)). When an MT desires to move into the proximity of, and receive packet communication from, a new BS ($BS_{new}$) on a new VLAN ($VLAN_{new}$), the MT issues a handoff message packet to $BS_{orig}$ for deregistering in step S100. The handoff packet contains the identifier for $VLAN_{new}$. The $BS_{orig}$ determines if the two VLANs are the same, i.e., if $VLAN_{new}$=$VLAN_{orig}$ in step S102. If so, then the server nodes need not modify their MTDs. Otherwise, in step S104, $BS_{orig}$ deregisters the MT and additionally transmits an MM1 frame to the server node on $VLAN_{orig}$. In response, in step S106, the server node on $VLAN_{orig}$ receives the MM1 message frame and extracts the contents thereof. The server node then determines if VLAN-ID(MT) is the same as $VLAN_{orig}$. If so, then an MT on the same $VLAN_{orig}$ is moving into proximity with a BS on another (foreign) VLAN. In such a case, the server node executes step S108 in which the server node increases the OUT-Count in its OUT-MTD. On the other hand, if VLAN-ID(MT) is not the same as $VLAN_{orig}$, then the MT is not on the same $VLAN_{orig}$ as the server node. In such a case, in step S110, the server node uses the VLAN-ID(MT) and $ATM(BS_{orig})$ as indexes to retrieve the corresponding entry of its IN-MTD. The server node then decreases the respective IN-Count value of the retrieved entry.

Next in step S112, the server node determines the tree of the $VLAN_{new}$ ($Tree_{new}$) and compares $Tree_{new}$ to the tree of $VLAN_{orig}$ ($Tree_{orig}$). If they are the same, the server node simply drops the MM1 frame in step S114 and the process ceases. However, if they are not the same, then the inter-tree-MTDs of each inter-tree server node must be updated to reflect movement of the MT to the proximity of a BS on another tree. In this latter case, in step S116, the server node transmits an MM2 message frame to its inter-tree server node (for Tree$_{orig}$) containing VLAN-ID(MT), an identifier for Treenew and an identifier for Tree$_{orig}$. The MM2 message frame is transmitted from child intra-tree server node to parent intra-tree server node, as necessary, until the MM2 message frame is received at the inter-tree server node for Tree$_{orig}$. In step S118, the inter-tree server node receives the MM2 message frame. Using VLAN-ID(MT) as an index, the server node retrieves the corresponding entry from its inter-tree-MTD. The inter-tree server node then increases the count for Tree$_{new}$ by one and decreases the count for Tree$_{orig}$ by one in the retrieved entry. The inter-tree server node then transmits a copy of the MM2 message frame to each other inter-tree server node which performs identical updatings of their inter-tree-MTDs.

Figure 7:
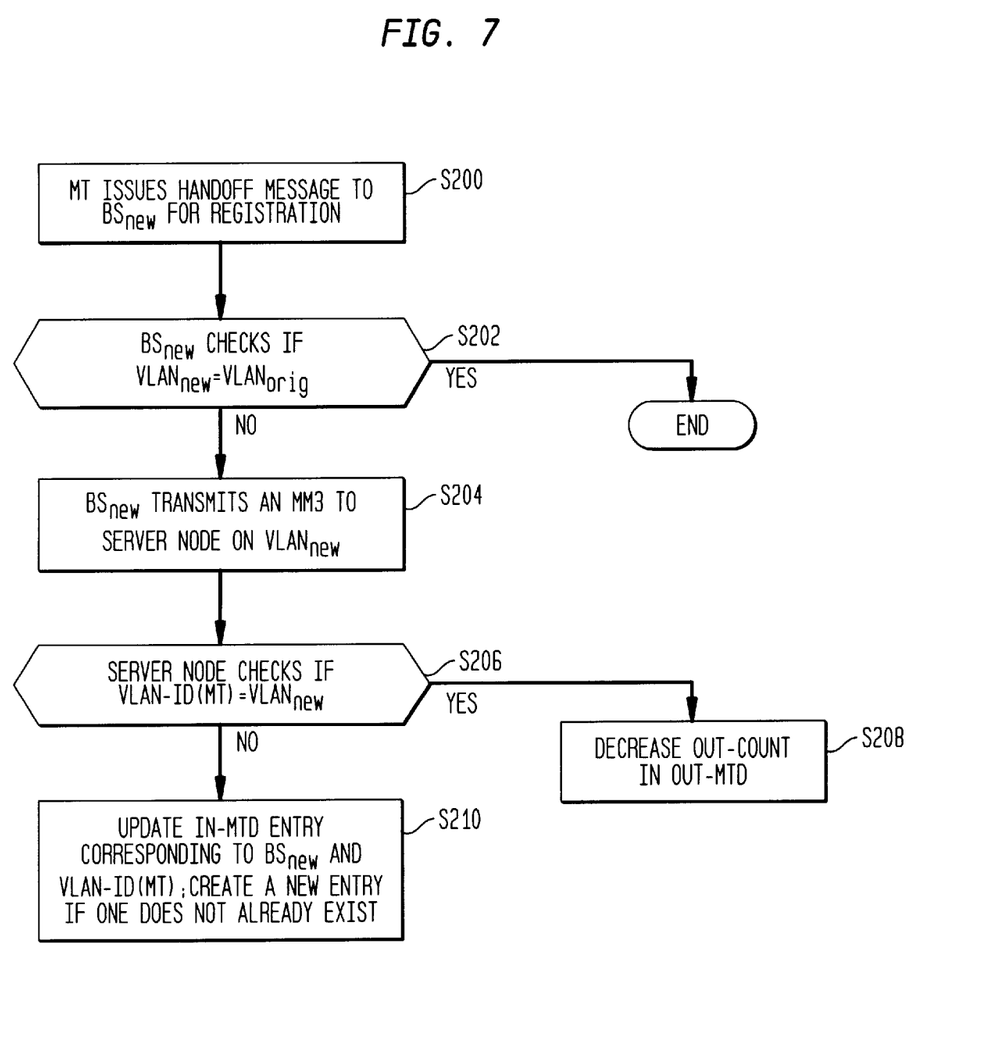
FIG. 7 shows a flowchart of the procedures performed by the moving MT, the $BS_{new}$ and the server node of the $VLAN_{new}$ when the MT moves.

Referring now to FIG. 7 a process executed by the moving MT, BS$_{new}$ and the server node on VLAN$_{new}$ is illustrated. When the MT moves to the proximity of BS$_{new}$, the MT issues a handoff message packet to BS$_{new}$ for registration in step S200. The handoff message packet contains the identifier for VLAN$_{orig}$. The BS$_{new}$ determines if VLAN$_{new}$ is the same as VLAN$_{orig}$ (VLAN$_{new}$=VLAN$_{orig}$) in step S202. If they are the same, then no updating of the IN-MTD or OUT-MTD is necessary. On the other hand, if VLAN$_{new}$ is different from VLAN$_{orig}$, BS$_{new}$ registers the MT and additionally transmits an MM3 frame to the server node on VLAN$_{new}$ in step S204. In step S206, the server node on VLAN$_{new}$ receives the MM3 message frame and determines if VLAN-ID(MT) is the same as VLAN$_{new}$ (VLAN-ID (MT)=VLAN$_{new}$). If so, then the MT has simply returned to the proximity of a BS on the same VLAN as the MT (and the server node). In such a case, in step S208, the server node simply decreases the OUT-Count value of the OUT-MTD.

On the other hand, if VLAN-ID(MT) is not the same as VLAN$_{new}$, then the MT is foreign to the VLAN$_{new}$, and the IN-MTD must be updated. In this latter case, in step S210, the server node uses the VLAN-ID(MT) and the ATM (BS$_{new}$) as indexes to retrieve a corresponding entry from the IN-MTD. However, it is possible that the moving MT is the first MT to move into the proximity of BS$_{new}$, in which case the IN-MTD will not have a corresponding entry. If no entry can be retrieved, the server node creates a new entry for VLAN-ID(MT) and writes VLAN-ID(MT) in the VLAN-ID field, ATM(BS$_{new}$) in the ATM(BS) field and the VCC of BS$_{new}$ in the VCC(BS) field (the VCC information is present at the server node which is presumed to include the LES). The IN-Count value of the retrieved or created entry is then increased by one.

Packet Routing Process

Figure 8:
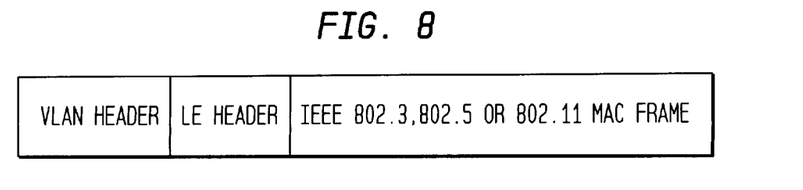
FIG. 8 shows a VLAN frame format according to an embodiment of the invention.

Referring to FIG. 8, an illustrative frame 50 is shown which may be used for transmitting packets in each VLAN during communication. As shown, the frame includes a VLAN header 52 and a LAN emulation header 54 that are prepended to a MAC frame 56. Illustratively, the various devices operate according to IEEE 802.3, (Ethernet) 802.5 or 802.11 and are all assigned unique MAC addresses. The VLAN header 52 illustratively includes an identifier of the VLAN of the device which transmitted the frame and other control information such as the packet lifetime duration, etc.

The packet routing process differs slightly depending on whether the packet is broadcast routed by a BUS or an address resolution is to be performed by an LES. The discussion below therefore uses the BUS as an example.

Figure 9:
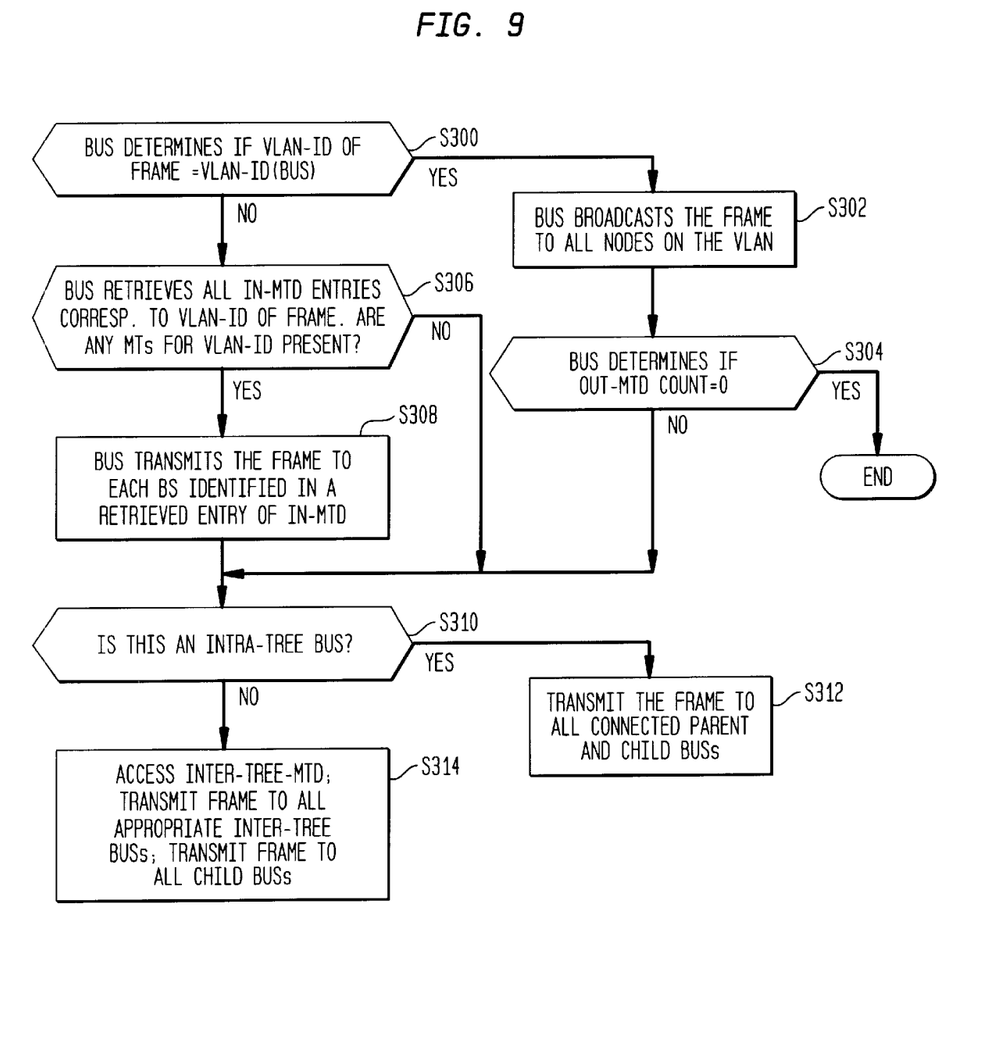
FIG. 9 shows a flowchart of the routing procedures performed by a BUS that receives a packet from a BS in the same VLAN.

FIG. 9 shows a process executed by a BUS (of a server node) in routing a broadcast packet on a VLAN. For example, assume that an MT transmits a broadcast packet (in the form of a frame 50 (FIG. 8)). Such a packet is received at the BS that provides packet communication for the MT. The BS transmits the received packet to its BUS. Next, in step S300, the BUS receives the broadcast packet and determines if the destination VLAN identified in the received frame is the same as the VLAN of the BUS. If so, then, in step S302, the BUS broadcasts the frame to all nodes on the VLAN containing the BUS. Next, the BUS retrieves the OUT-MTD and determines if the OUT-Count is zero. If so, then no MTs on this VLAN are provided packet communication from a foreign BS on another VLAN. In such a case, the transmission of the frame in step S302 is sufficient to deliver the packet to all nodes on the VLAN and the process ceases. However, if the OUT-Count is non-zero, then at least one MT on this VLAN is provided packet communication by a BS in a foreign VLAN. In this latter case, the BUS executes step S310 described below.

Assume now, that the BUS determines that the destination VLAN identified in the received frame is not the same as the VLAN that the BUS is on. In such a case, the BUS executes step S306, wherein the BUS retrieves all entries of the IN-MTD indexed by the VLAN identifier in the received frame. If no entries are retrieved in step S306 then there are no foreign MTs for which a BS of this VLAN is providing packet communication which foreign MT is also on the same VLAN as indicated in the received frame. In such a case, the BUS executes step S310 (described below). On the other hand, if at least one entry is retrieved then there is a foreign MT for which a BS of this VLAN is providing packet communication which foreign MT is also on the same VLAN as indicated in the frame (and therefore must receive the frame). In this latter case, the BUS executes step S308 in which the BUS transmits the frame to the BS indicated in each retrieved entry (using the ATM address and VCC indicated in the respective retrieved entries). As a result, a copy of the frame is transmitted to each BS which provides packet communication to at least one foreign MT also on the same VLAN as indicated in the frame. In response, each BS transmits the frame to each MT on the same VLAN as indicated in the received frame. The BUS then executes step S310.

In step S310, the BUS determines if it is an intra-tree BUS (at an intra-tree server node) or an inter-tree BUS (at an inter-tree server node). If the BUS is an intra-tree BUS, then, in step S312, the BUS transmits the frame to each child BUS (at a child server node) and each parent BUS (at a parent server node) of the tree containing the BUS. On the other hand, if the BUS is an inter-tree BUS, in step S314, the BUS transmits the frame to each child BUS. Furthermore, the inter-tree BUS retrieves from its inter-tree-MTD entry corresponding to the VLAN-ID contained in the frame. Using the retrieved entry, the inter-tree BUS determines each other tree having a BS providing packet communication for an MT on the same VLAN as identified in the frame (and which MTs also must receive a copy of the frame). The inter-tree BUS then transmits a copy of the frame to each such inter-tree BUS.

Figure 10:
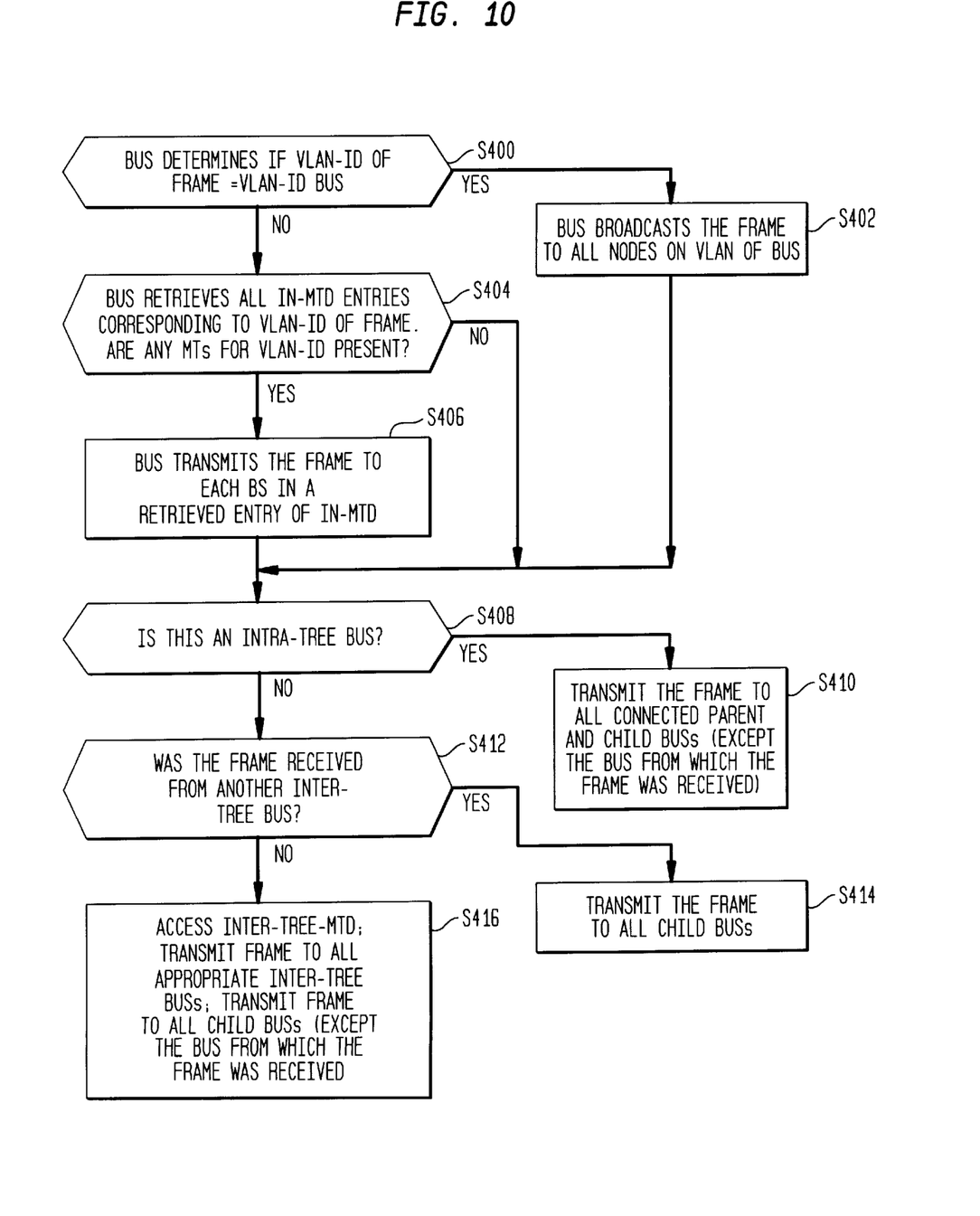
FIG. 10 shows a flowchart of the routing procedures performed by a BUS that receives a packet from another interconnected BUS.

FIG. 10 shows the procedure executed by a BUS which receives a frame from another BUS. In step S400, the BUS determines if the destination VLAN identified in the frame is the same as the VLAN of the BUS. If so, in step S402, the BUS transmits the frame to all nodes on the VLAN of the BUS. Processing then continues in step S408. If the VLAN of the BUS is different than the destination VLAN identified in the received frame, the BUS executes step S404. In step S404, the BUS retrieves all IN-MTD entries indexed by the VLAN-ID in the received frame. If no entries can be retrieved, then no BSs of this VLAN are providing packet communication for MTs on the same VLAN as identified in the frame. In such a case, the BUS, skips step S406 and proceeds directly to executing step S408. On the other hand, if at least one entry is retrieved then at least one BS on the VLAN of the BUS is providing packet communication for an MT on the same VLAN as identified in the frame and therefore must receive a copy of the frame. In this latter case, in step S406, the BUS transmits the frame to each BS indicated in each retrieved entry (using the ATM address and VCC identifier specified in the retrieved entries). The BUS the executes step S408.

In step S408, the BUS determines whether or not it is an intra-tree BUS. If so, in step S410, the BUS transmits the frame to all connected parent and child BUSs. However, the BUS does not transmit the frame back to the BUS from which the frame was initially received. The process then ends.

On the other hand, if the BUS is an inter-tree BUS, the BUS executes step S412. In step S412, the BUS determines whether or not the frame was received from another inter-tree BUS. This would be the case if the frame originated at another tree. If so, then all other trees having a BS that provides packet communication for an MT on the VLAN identified in the frame have already received a copy of the frame. In such a case, all that is necessary to do is to transmit the frame to each child BUS in step S414. The process then ends.

Assume that the BUS from which the frame originated was not another inter-tree BUS. In such a case, the frame originated in the same tree and no other inter-tree BUSs have yet received a copy of the frame. In step S416, the inter-tree BUS retrieves from its inter-tree-MTD an entry corresponding to the VLAN-ID contained in the frame. The inter-tree BUS then determines each other inter-tree BUS having a BS providing packet communication to an MT on the same VLAN as identified in the frame. The inter-tree BUS then transmits the frame to each such inter-tree BUS. In addition, the inter-tree BUS transmits the frame to each child BUS, except, of course, the child BUS from which the frame originated.

From the above procedures, the following observations can be made. When a BUS receives a broadcast frame and the BUS is on the same VLAN as specified as the destination in the frame, the BUS transmits the frame to each node of its VLAN. If the BUS is not on the same VLAN, the BUS first determines if, nevertheless, some foreign MTs on the same VLAN as identified in the frame may be in the proximity of, and provided packet communication by, a BS of the VLAN of the BUS. If so, the BUS transmits a copy of the frame to each such BS. Lastly, the BUS transmits the frame in the upward and downward directions of its tree. That is, the BUS transmits a copy of the frame to its parent BUS and to its children BUSs (except of course that the frame is not transmitted back to a BUS from which it originated). This enables each other BUS in the tree to perform the same routing. Inevitably, the frame reaches the inter-tree BUS at the root of the tree. The inter-tree BUS transmits a copy of the frame to each inter-tree BUS having a BS that provides packet communication to an MT on the same VLAN as identified in the frame. Each of the inter-tree BUSs performs the same processing and transmits the frame in the downward direction on their respective trees. In short, a broadcast frame is routed within each tree in which it originated and to each other tree that an MT on the same VLAN indicated as a destination in the frame has moved.

EXAMPLE

In this section, the movement of MTs and subsequent routing of packets in the communication network shown in FIGS. 4 and 5 is now described for purposes of illustrating the above processes. Consider first a communication from MT3 to S4 in FIG. 4 prior to movement of MT3. In the absence of movement, the frame exchanging operation is performed according to the conventional ATM LAN emulation protocol.

Consider now the case where MT1 moves to the proximity of BS1. In addition to deregistering MT1, BS2 transmits an MM1 message frame with VLAN-ID(MT1)=VLAN (0,7), $VLAN_{new}$=VLAN(0,5) and ATM($BS_{orig}$)=ATM (BS2) to the LES/BUS (server node) on VLAN(0,7). The LES/BUS(0,7) on VLAN(0,7) determines that MT1 is on the same VLAN as LES/BUS(0,7) because VLAN-ID(MT1)= VLAN(0,7)=VLAN of the LES/BUS(0,7). Thus, LES/BUS (0,7) increases the OUT-Count in the OUT-MTD from 0 to 1. Next, the LES/BUS(0,7) determines that the new tree ($Tree_{new}$) to which MT1 is moving, namely, Tree0, is the same as the original tree ($Tree_{orig}$), namely, Tree0, from which MT1 started. Thus, no MM2 message frame is transmitted.

BS1 also transmits an MM3 message frame to the LES/BUS on VLAN(0,5), namely LES/BUS(0,5), with VLAN-ID(MT1)=VLAN(0,7) and the ATM address of $BS_{new}$=BS1. The LES/BUS(0,5) compares VLAN-ID(MT)=VLAN(0,7) to $VLAN_{new}$ of the LES/BUS(0,5)=VLAN(0,5). Because they are different, the LES/BUS(0,5) updates its IN-MTD to reflect an increase in the number of foreign MTs. In this case, the IN-MTD has no entry for the VLAN(0,7) and therefore creates one. The LES/BUS(0,5) sets the IN-Count to 1 and also writes both the ATM(BS1) and VCC(BS1) in the newly created table entry. Afterwards, the IN-MTD is as shown in Table 3:

TABLE 3

| VLAN-ID | In-Count | ATM address of BS | VCC to BS |
|---------|----------|-------------------|-----------|
| (0,7)   | 1        | ATM(BS1)          | VCC(BS1)  |

Consider now the processing when MT3 moves to the proximity of BS3. In addition to deregistering MT3, BS2 transmits an MM1 frame containing VLAN-ID (MT3)= VLAN (0,7), $VLAN_{new}$=VLAN(1,5) and ATM ($BS_{orig}$)= ATM(BS2), to the LES/BUS (server node) on VLAN(0,7). The LES/BUS(0,7) on VLAN(0,7) determines that MT3 is on the same VLAN as LES/BUS(0,7) because VLAN-ID (MT3)=VLAN(0,7)=VLAN of the LES/BUS(0,7). Thus, LES/BUS(0,7) increases the OUT-Count in the OUT-MTD from 1 to 2. Next, the LES/BUS(0,7) determines that $Tree_{new}$ to which MT3 is moving, namely, Tree1, is different from $Tree_{orig}$ namely, Tree0, from which MT3 started. As such, the LES/BUS(0,7) transmits an MM2 message frame to the inter-tree LES/BUS (0,1) (via the LES/BUS(0,3)) containing VLAN-ID(MT3)=VLAN(0,7), $Tree_{orig}$=Tree0 and $Tree_{new}$=Tree1. In response, the LES/BUS(0,1) modifies its inter-tree-MTD by retrieving the entry corresponding to VLAN-ID(MT3)=VLAN(0,7), increasing the count for Tree1 by one and decreasing the count for Tree0 by one. The LES/BUS(0,1) then transmits the MM2 frame to each other inter-tree LES/BUS, namely, the LES/BUS(1,1), the LES/BUS(2,1) and the LES/BUS(3,1) which perform an identical modification to their respective inter-tree-MTDs. Afterwards, the inter-tree-MTDs are as shown in Table 4:

TABLE 4

| VLAN-ID | Count (Tree0) | Count (Tree1) | Count (Tree2) | Count (Tree3) |
|---|---|---|---|---|
| .... | .... | .... | .... | .... |
| (0,7) | 2 | 1 | 0 | 0 |
| ... | ... | ... | ... | ... |

On the other hand, BS3 transmits an MM3 message frame with VLAN-ID(MT3)=VLAN(0,7) and ATM(BS$_{new}$)=ATM (BS3) to the LES/BUS on VLAN(1,5), namely, LES/BUS (1,5). The LES/BUS(1,5) compares VLAN(MT3)=VLAN (0,7) to VLAN$_{new}$ of the LES/BUS(1,5)=VLAN(1,5). Because they are different, the LES/BUS(1,5) updates its IN-MTD to reflect an increase in the number of foreign MTs. In this case, the IN-MTD has no entry for the VLAN(0,7) and therefore creates one. The LES/BUS(1,5) sets the IN-Count to 1 and also writes both the ATM(BS3) and VCC(BS3) in the newly created table entry. Afterwards, the IN-MTD is as shown in Table 5:

TABLE 5

| VLAN-ID | In-Count | ATM address of BS | VCC to BS |
|---|---|---|---|
| (0,7) | 1 | ATM(BS3) | VCC(BS3) |

Consider now the case that node s4 transmits a broadcast packet on VLAN(0,7). The node s4 transmits a frame containing the packet to BUS(0,7). BUS(0,7) receives the frame and determines that BUS(0,7) is on the same VLAN as the intended destination of the frame. Thus, BUS(0,7) transmits the frame to all nodes on VLAN(0,7) including BS2. BS2 transmits the frame to MT2. Next BUS(0,7) checks the OUT-Count and determines that it is non-zero. As such, BUS(0,7) determines that it is an intra-tree BUS and transmits the frame to its attached parent BUS(0,3). BUS (0,3) transmits the frame to BUS(0,6) and BUS(0,1). The BUS(0,1) determines that it is an inter-tree BUS and retrieves the entry of its inter-tree-MTD corresponding to the destination VLAN indicated in the frame (namely, VLAN(0,7)). Since the retrieved entry indicates that an MT for VLAN(0,7) is present at Tree1, the BUS(0,1) transmits the frame to the BUS(1,1). Furthermore, the BUS(0,1) transmits the frame to BUS(0,2) which transmits the frame to BUS(0,4) and BUS(0,5). The frame is received at the BUS(1,1) which transmits the frame to the BUS(1,2) and the BUS(1,3). The BUS(1,2) transmits the frame to the BUS(1, 4) and the BUS(1,5). The BUS(1,3) transmits the frame to the BUS(1,6) and the BUS(1,7)

In each of the BUSs which receive the frame except the BUS (0,5) and the BUS(1,5), the IN-MTD is accessed but no MTs on the VLAN(0,7) are indicated as present. Thus, these BUSs do not transmit the frame to any nodes thereat. On the other hand, both the BUS(0,5) and the BUS(1,5) retrieve an entry from their respective IN-MTDs for the VLAN(0,7) indicating that a local BS (i.e., BS1 or BS3, respectively) is providing packet communication for an MT on the VLAN (0,7). The BUS(0,5) transmits the frame to the BS1 using the ATM(BS1) and VCC(BS1) indicated in the retrieved entry. Likewise, the BUS(1,5) transmits the frame to BS3 using the ATM(BS3) and VCC(BS3) indicated in the retrieved entry. The BS1 receives the frame and transmits it to MT1. BS3 receives the frame and transmits it to BS3.

Consider now the case where MT3 transmits a broadcast packet for receipt on the VLAN(0,7). BS3 receives the frame containing the packet and transmits it to BUS(1,5). BUS(1, 5) determines that the frame is destined for another VLAN. BUS(1,5) furthermore determines (from examining IN-MTD) that only BS3 provides packet communication for an MT on VLAN(0,7). However, because the frame was received from BS3, it is not transmitted back to BS3 as per a conventional broadcast process. BUS(1,5) then transmits the frame to BUS(1,1). BUS(1,1) determines from its inter-tree-MTD that the frame must be transmitted to BUS(0,1) and transmits the frame to BUS(0,1). BUS(0,1) receives the frame and transmits the frame to BUS(0,5) and BUS(0,7). BUS(0,5) determines from its IN-MTD that an MT on VLAN(0,7) is present thereat and transmits the frame to BS1 (as determined from the IN-MTD entry corresponding to VLAN(0,7)). BS1 transmits the frame to MT1. BUS(0,7) receives the frame and determines that the frame is destined to VLAN(0,7) which is also the VLAN that the BUS(0,7) is on. As such, BUS(0,7) transmits the frame to each node, including the node s4 and the node BS2. The node BS2 transmits the frame to the MT2.

Now consider the case where MT3 desires to transmit a unicast packet to MT2. Since BS3 does not know the ATM address of MT2, BS3 transmits an ARP request packet in a frame to LES(1,5). While waiting for a reply from LES(1,5), BS3 also transmits the unicast packet to BUS(1,5). LES(1,5) determines that the destination of the ARP request packet bearing frame is in another VLAN. As such, the LES(1,5) transmits the frame to the inter-tree LES(1,1) via the LES (1,2). Using a similar routing scheme as described above, the frame is transmitted to each LES in Tree1 including the LES(1,1). The LES(1,1) determines from its inter-tree-MTD that a copy of the frame must be transmitted to the inter-tree LES(0,1). The LES(0,1) receives the frame and transmits it to each child LES. Again, the packet is transmitted to each LES in Tree0 including the LES(0,5) and the LES(0,7). LES(0,5) transmits the frame to BS1 using information contained in its IN-MTD indexed by the VLAN-ID contained in the frame. Likewise, LES(0,7) receives the ARP request packet and determines that the packet is destined to VLAN(0,7) which is also the VLAN that the LES(0,7) is on. As such, LES(0,7) transmits the ARP request packet to all bridge nodes on VLAN(0,7). However, only BS2 replies to the ARP request packet in the frame with ATM(BS2). The reply packet bearing frame is transmitted back using a similar routing procedure as the request packet bearing frame until it reaches LES(1,5). LES(1,5) uses its IN-MTD to determine that the reply packet bearing frame should be transmitted to BS3. Upon receiving the reply packet bearing frame, BS3 establishes a VCC to BS2 for transmitting the unicast packets.

Finally, consider the case where MT3 moves back to the proximity of BS2. First, BS3 transmits an MM1 message frame to LES/BUS(1,5) containing VLAN-ID(MT3)= VLAN(0,7), VLAN$_{new}$=VLAN(0,7) and ATM(BS$_{orig}$)= ATM(BS3). LES/BUS( 1,5) retrieves the entry of IN-MTD corresponding to VLAN-ID(MT3)=VLAN(0,7) and ATM (B3). LES/BUS(1,5) decreases the IN-Count of the retrieved entry by one. LES/BUS(1,5) also issues an MM2 message frame to LES/BUS(1,1). LES/BUS(1,1) updates its inter-tree-MTD to reflect the movement of MT3. In particular, the entry corresponding to VLAN-ID(MT3)=VLAN(0,7) is retrieved, the count for Tree0 is increased by one and the count for Tree1 is decreased by one. The LES/BUS(1,1) also transmits the MM2 message frame to each other inter-tree LES/BUS (which perform an identical modification). On the other hand, BS2 transmits the MM3 message frame to LES/BUS(0,7). LES/BUS(0,7) decreases the OUT-Count value in its OUT-MTD.

Conclusion

In short, a method and system are provided for implementing virtual local area networks using IP over ATM. The server nodes are connected by (fixed or dynamic) virtual channels (VCs) into multiple trees. The root server nodes are then interconnected by VC's into a hypercube. While the VC's that form the interconnection may be fixed or dynamic, the hypercube over tree interconnection structure of the server nodes illustratively remains fixed.

Each server node maintains two MT membership tracking databases (MTDs) referred to as IN-MTD and OUT-MTD. OUT-MTD simply records the number of MTs on the same VLAN -as the server which have moved into the proximity of, and are provided packet communication by, a BS on a different VLAN. Conversely, the server node uses the IN-MTD to record the local BSs (i.e., on the same VLAN as the server node) which provide packet communication for foreign MTs. The IN-MTD has one or more entries which each contain: an identifier of a foreign VLAN, an ATM address of a local BS, a VCC for communicating with the respective local BS and a count of the number of foreign MTs on the corresponding VLAN for which the corresponding local BS provides packet communication. In addition, the root server nodes also maintain an inter-tree-MTD. The inter-tree-MTD indicates, for each VLAN, the number of MTs provided packet communication by a BS of each tree. Procedures are provided for maintaining the MTDs and for using them route packets for both broadcast and unicast routing.

Finally, the above-discussion is intended to be merely illustrative of the invention. Numerous alternative embodiments may be devised by those having ordinary skill in the art without departing from the spirit and scope of the following claims.

The claimed invention is:

1. In an asynchronous transfer mode (ATM) network, wherein a plurality of virtual local area network (VLAN) server nodes are connected by virtual channels into plural trees, wherein at least some of said VLANs comprise base stations (BSs) capable of providing packet communication for one or more mobile terminals (MTs), a method of tracking a location of each MT comprising the steps of:

(a) maintaining in an original BS ($BS_{orig}$) on an original VLAN ($VLAN_{orig}$) a record corresponding to each MT for which said $BS_{orig}$ provides packet communication which record contains an identifier (VLAN-ID) of one of said VLANs which said MT is on (VLAN-ID(MT)), (b) transmitting a message frame, from said $BS_{orig}$ which currently provides packet communication for an MT, to a server node of said $VLAN_{orig}$, said message frame, containing said VLAN-ID(MT), a VLAN-ID of a new VLAN ($VLAN_{new}$) and an ATM address of said $BS_{orig}$ ($ATM(BS_{orig})$), (c1) if said MT is on said $VLAN_{orig}$, increasing said number of MTs on $VLAN_{orig}$ which have moved; and (c) receiving said message frame at said server node of said $VLAN_{orig}$ and updating a mobility terminal membership tracking database (MTD) maintained at said server node to reflect said movement of said MT.

2. The method of claim 1 wherein said step (b) further comprises:

(b1) for each movement, determining a new VLAN ($VLAN_{new}$) containing a new BS ($BS_{new}$) which will provide packet communication for said MT after said movement, (b2) performing said steps (b)–(c) only if said $VLAN_{new}$ of said MT is different than said $VLAN_{orig}$ of said MT, and (b3) if said $VLAN_{new}$ of said MT is the same as said $VLAN_{orig}$ of said MT, ceasing to provide packet communication for said MT at said $BS_{orig}$.

3. The method of claim 1 wherein said server node of said $VLAN_{orig}$ maintains a plurality of MTD's including an OUT-MTD for recording the number of MT's on $VLAN_{orig}$ which have moved into proximity of, and which are provided packet communication by, a BS of a VLAN other than $VLAN_{orig}$, and an IN-MTD, said IN-MTD configured to store at least one entry, each entry of said IN-MTD corresponding to one of said VLANs other than $VLAN_{orig}$, on which MTs of said one VLAN are provided packet communication by a particular BS of said $VLAN_{orig}$, and containing:

(i) said VLAN-ID of said VLAN corresponding to said entry, (ii) a count of the number of MTs on said corresponding VLAN currently in a proximity of, and being provided packet communication by, said particular BS of $VLAN_{orig}$, (iii) an ATM address of said particular BS to which said entry pertains, and (iv) a virtual channel connection (VCC) of said particular BS to which said entry pertains.

4. The method of claim 3 wherein step (c) further comprises the steps of:

(c1) if said MT is on said $VLAN_{orig}$, increasing said number of MTs on $VLAN_{orig}$ which have moved into proximity of, and which are provided packet communication by, a BS of a VLAN other than $VLAN_{orig}$ in said OUT-MTD, and (c2) otherwise, using VLAN-ID(MT) and said ATM address of said $BS_{orig}$ in said message frame as indexes for retrieving a corresponding entry of said IN-MTD and decreasing said count of said number of MTs on said corresponding VLAN currently in a proximity of, and being provided packet communication by said particular BS of $VLAN_{orig}$, in said retrieved entry of said IN-MTD.

5. The method of claim 1 further comprising the steps of:

(d) if a tree containing said $VLAN_{new}$ ($Tree_{new}$) is different from a tree containing said $VLAN_{orig}$ ($Tree_{orig}$):

(d1) transmitting a second message frame from said server node in said $VLAN_{orig}$ to a server node at a root at said $Tree_{orig}$, said second message frame containing VLAN-ID(MT), and identifiers for $Tree_{orig}$ and $Tree_{new}$, (d2) receiving said second message frame at said root server node of said $Tree_{orig}$ and updating and inter-tree-MTD thereat to indicate the movement of said MT from $Tree_{orig}$ to $Tree_{new}$, and (d3) transmitting said packet from said root server node of $Tree_{orig}$ to each other root server node of each other one of said trees.

6. The method of claim 1 farther comprising the steps of:

(e) maintaining in a new BS ($BS_{new}$), into which proximity said MT moves, and which will provide packet communication for said MT after said movement, a record corresponding to each MT for which said $BS_{new}$ provides packet communication which record contains said VLAN-ID(MT), (f) determining at said $BS_{new}$ whether or not said $VLAN_{new}$ is the same as $VLAN_{orig}$ of said MT, (g) if said VLAN$_{new}$ is not the same as said VLAN$_{orig}$, said BS$_{new}$ transmitting a second message frame to a server node of said VLAN$_{new}$, said second message frame containing VLAN-ID(MT) and an ATM address of said BS$_{new}$, and (h) receiving said second message frame at said VLAN$_{new}$ and updating a MTD maintained at said server node to reflect said movement of said MT.

7. The method of claim 6 wherein said step (f) further comprises:

(f1) for each movement, determining said VLAN$_{new}$ of said BS$_{new}$ which will provide packet communication for said MT after said movement, (f2) performing said steps (g)–(h) only if said VLAN$_{new}$ of said MT is different than said VLAN$_{orig}$ of said MT, and (f3) if said VLAN$_{new}$ of said MT is the same as said VLAN$_{orig}$ of said MT, said BS$_{new}$ beginning to provide packet communication for said MT.

8. The method of claim 6 wherein said server node of said VLAN$_{new}$ maintains a plurality of MTD's including an OUT-MTD for recording the number of MT's on VLAN$_{new}$ which have moved into proximity of, and which are provided packet communication by, a BS of a VLAN other than VLAN$_{new}$, and an IN-MTD, said IN-MTD configured to store at least one entry, each entry of said IN-MTD corresponding to one of said VLANs other than VLAN$_{new}$ on which MTs of said one VLAN are provided packet communication by a particular BS of said VLAN$_{new}$, and containing:

(i) said VLAN-ID of said VLAN corresponding to said entry, (ii) the number of MTs on said corresponding VLAN currently in a proximity of, and being provided packet communication by, said particular BS of VLAN$_{new}$, (iii) an ATM address of said particular BS to which said entry pertains, and (iv) a virtual channel connection (VCC) of said particular BS to which said entry pertains.

9. The method of claim wherein step (c) further comprises the steps of:

(c1) if said MT is on said VLAN$_{new}$, decreasing said number of MTs on VLAN$_{new}$ which have moved into proximity of, and which are provided packet communication by, a BS of a VLAN other than VLAN$_{new}$ in said OUT-MTD, and (c2) otherwise, using VLAN-ID(MT) and said ATM address of said BS$_{new}$, in said message frame as indexes for retrieving a corresponding entry of said IN-MTD, (c3) if no entry is retrieved in step (c2), creating an entry in said IN-MTD containing said VLAN-ID(MT) as said VLAN-ID of said corresponding entry, said ATM address of said BS$_{new}$ as said ATM address of said particular BS that provides packet communication for each of said MT's to which said entry pertains, and a VCC for communicating to said BS$_{orig}$ as said VCC of said particular BS to which said entry pertains, and (c4) increasing said count of said number of MTs on said corresponding VLAN currently in a proximity of, and being provided packet communication by said particular BS of VLAN$_{new}$, in said IN-MTD entry indexed by said VLAN-ID(MT) and said ATM address of said BS$_{new}$.

10. In an asynchronous transfer mode (ATM) network, wherein a plurality of virtual local area network (VLAN) server nodes are connected by virtual channels into plural trees, wherein at least some of said VLANs comprise base stations (BSs) capable of providing packet communication for one or more mobile terminals (MTs), a method of communicating packets comprising the steps of:

(a1) receiving a message frame from an original BS (BS$_{orig}$) which originally provided packet communication for a moving MT, at a server node original VLAN (VLAN$_{orig}$) containing said BS$_{orig}$, (a) receiving a packet containing a destination VLAN identifier (VLAN-ID) at a server node of a VLAN, (b1) if said MT is on said VLAN$_{orig}$, increasing said number of MTs on VLAN$_{orig}$ which have moved, (b) if said server node is not a root node of a tree, transmitting said packet to a parent server node of said tree, and (c) otherwise if said server node is a root node of said tree;

(d) accessing an inter-tree-MTD maintained at said server node, to determine each other tree containing at least one MT on said VLAN identified by said destination VLAN, and (e) transmitting a copy of said packet to each of said trees identified in said step (d).

11. The method of claim 10, wherein if said server node is not said root node of said tree, said method further comprises the step of transmitting said packet to each other terminal on said VLAN of said server node, if said destination VLAN is the same as said VLAN of said server node.

12. The method of claim 10, wherein if said server node is not said root node of said tree, said method further comprises the steps of:

(f) maintaining at said server node an IN-MTD comprising at least one entry, each entry of said IN-MTD corresponding to one of said VLANs other than said VLAN containing said IN-MTD on which MTs of said one VLAN are provided packet communication by a particular BS of said VLAN containing said IN-MTD, and containing:

(i) said VLAN-ID of said VLAN corresponding to said entry, (ii) the number of MTs on said corresponding VLAN currently in a proximity of, and being provided packet communication by, said particular BS, (iii) an ATM address of said particular BS to which said entry pertains, and (iv) a virtual channel connection (VCC) of said particular BS to which said entry pertains, and (g) if said IN-MTD has one or more entries corresponding to said VLAN-ID(MT), transmitting said packet to each BS indicated in each of said corresponding entries.

13. The method of claim 10 further comprising the steps of:

(f) if said packet is received from a child server node, in addition to transmitting said packet to said parent server node, transmitting said packet to each child server node of said tree other than said child server node from which said packet was received, and (g) otherwise, transmitting said packet to each other child server node of said tree.

14. The method of claim 10 wherein said packet is a request packet requesting an unknown address of another terminal in a VLAN other than said VLAN containing said terminal which originated said packet, said method further comprising the steps of:

(f) receiving said request packet at a node in said VLAN containing said other terminal, (g) determining an address of said other terminal and transmitting a response packet back to said terminal which issued said request packet containing an ATM address for establishing a VCC with said other terminal, (h) communicating between said terminal which issued said request packet and said other terminal by transmitting at least one packet via said VCC.

15. The method of claim 14 wherein said other terminal is a MT, said request packet is received at a BS that provides packet communication for said MT, said BS inserts an ATM address of said BS into said response packet and wherein said step (h) further comprises receiving said at least one packet via said VCC at said BS and transmitting said at least one packet to said MT.

16. In an asynchronous transfer mode (ATM) network, wherein a plurality of virtual local area network (VLAN) server nodes are connected by virtual channels into plural trees, wherein at least some of said VLANs comprise base stations (BSs) capable of providing packet communication for one or more mobile termiinals (MTs), a method of tracking a location of each MT comprising the steps of:

(a1) maintaining in an original BS ($BS_{orig}$) on an original VLAN ($VLAN_{orig}$) a record corresponding to each MT for which said $BS_{orig}$ provides packet communication which record contains an identifier (VLAN-ID) of one of said VLANs which said MT is on (VLAN-ID(MT)), (a) maintaining an inter-tree MT membership tracking database (inter-tree-MTD) at a root server node, containing at least one entry, each entry of said inter-tree-MTD corresponding to a different one of said VLANs and containing:
 (i) an identifier of the corresponding VLAN (VLAN-ID), and
 (ii) a count of the number of MTs of the VLAN corresponding to said entry which are contained in each tree, (b) in response to receiving at said root server node a message frame indicating that a MT has moved from a proximity of a BS in an original tree ($Tree_{orig}$) to a proximity of another BS in a new tree ($Tree_{new}$):

(c) retrieving an entry of said inter-tree-MTD of said root server node corresponding to a VLAN-ID of the VLAN that said moving MT (VLAN-ID(MT)) is on, (d) decreasing a count of said retrieved entry associated with $Tree_{orig}$ and increasing a count of said entry associated with $Tree_{new}$, wherein if said MT is on said $VLAN_{orig}$, increasing said number of MTs on $VLAN_{orig}$ which have moved.

17. In an asynchronous transfer mode (ATM) network, wherein a plurality of virtual local area network (VLAN) server nodes are connected by virtual channels into plural trees, wherein at least some of said VLANs comprise base stations (BSs) capable of providing packet communication for one or rmore mobile terminals (MTs), a method of tracking a location of each MT comprising the steps of:

(a) receiving a message frame from an original BS ($BS_{orig}$) which originally provided packet communication for a moving MT, at a server node of an original VLAN ($VLAN_{orig}$) containing said $BS_{orig}$, said message frame indicating an identifier of one of said VLANs which said MT is on (VLAN-ID(MT)), a new VLAN ($VLAN_{new}$) containing a new BS ($BS_{new}$) into a proximity of which said MT moves, and which will provide packet communication for said MT, and an ATM address of said $BS_{orig}$.

(b) updating a mobile terminal membership tracking database (MTD) maintained at said server node to reflect said movement of said MT, wherein if said MT is or said $VLAN_{orig}$, increasing said number of MTs on $VLAN_{orig}$ which have moved.

18. The method of claim 17, further comprising the steps of (c) receiving a message frame from a new BS ($BS_{new}$) into a proximity of which originally an MT moves, at said server node containing said $BSn_{new}$, said message frame indicating an identifier of a VLAN that said MT is on (VLAN-ID(MT)), said message frame also indicating an ATM address of said $BS_{new}$, (d) updating a mobile terminal membership tracking database (MTD) maintained at said server node to reflect said movement of said MT.

19. An asynchronous transfer mode (ATM) communications network comprising:

a plurality of server nodes interconnected by virtual channels (VCs) into a plurality of trees, a plurality of base stations (BSs) including a first BS connected by a first legacy local area network (LAN) to a first one of said server nodes, a plurality of terminals connected to said first legacy LAN, including a mobile terminal (MT) which registers with, and is provided packet service by, said first BS when said MT is in a proximity of said first BS, wherein a message frame from an original BS, ($BS_{orig}$) which originally provided packet communation for a moving MT is received at a sever node of an original VLAN ($VLAN_{orig}$) containing said $BS_{orig}$, wherein if said MT is on said $VLAN_{orig}$ increasing said number of MTs on $VLAN_{orig}$ which have moved.

wherein said BS's, MTs sever nodes and terminals are organized into plural virtual local area networks (VLANs), and wherein each root server node maintains information regarding which of said trees contains said first MT so as to enable routing packets to and from said MT.

20. The method of claim 1 wherein the root nodes of said plural trees are interconnected by virtual channels into a hypercube.

21. The method of claim 10 wherein the root nodes of said plural trees are interconnected by virtual channels into a hypercube.

22. The method of claim 16 wherein the root nodes of said plural trees are interconnected by virtual channels into a hypercube.

23. The method of claim 17 wherein the root nodes of said plural trees are interconnected by virtual channels into a hypercube.

24. The network of claim 19 wherein each root server node is connected by VCs into a hypercube.

* * * * *